US011599792B2

(12) United States Patent
Li et al.

(10) Patent No.: US 11,599,792 B2
(45) Date of Patent: Mar. 7, 2023

(54) SYSTEM AND METHOD FOR LEARNING WITH NOISY LABELS AS SEMI-SUPERVISED LEARNING

(71) Applicant: salesforce.com, inc., San Francisco, CA (US)

(72) Inventors: Junnan Li, Singapore (SG); Chu Hong Hoi, Singapore (SG)

(73) Assignee: SALESFORCE.COM, INC., San Francisco, CA (US)

(*) Notice: Subject to any disclaimer, the term of this patent is extended or adjusted under 35 U.S.C. 154(b) by 615 days.

(21) Appl. No.: 16/688,104

(22) Filed: Nov. 19, 2019

(65) Prior Publication Data

US 2021/0089883 A1 Mar. 25, 2021

Related U.S. Application Data

(60) Provisional application No. 62/905,055, filed on Sep. 24, 2019.

(51) Int. Cl.
G06N 3/08 (2006.01)
G06N 3/04 (2006.01)

(52) U.S. Cl.
CPC ............. G06N 3/08 (2013.01); G06N 3/0454 (2013.01); G06N 3/0472 (2013.01)

(58) Field of Classification Search
CPC ...... G06N 3/0454; G06N 3/0472; G06N 3/08; G06N 7/005
USPC .......................................................... 706/25
See application file for complete search history.

(56) References Cited

U.S. PATENT DOCUMENTS

| | | | | |
|---|---|---|---|---|
| 7,366,705 B2* | 4/2008 | Zeng | ..................... | G06F 16/355 706/20 |
| 9,299,347 B1* | 3/2016 | Siohan | ..................... | G10L 15/02 |
| 10,204,619 B2* | 2/2019 | Siohan | ..................... | G10L 15/02 |
| 10,275,690 B2* | 4/2019 | Chen | ..................... | G06K 9/6259 |
| 10,282,663 B2 | 5/2019 | Socher et al. | | |
| 10,346,721 B2 | 7/2019 | Albright et al. | | |
| 10,552,944 B2* | 2/2020 | Wang | ..................... | G06T 3/4046 |
| 10,601,454 B1* | 3/2020 | Luus | ..................... | G06N 3/0454 |
| 10,635,943 B1* | 4/2020 | Lebel | .................. | G06K 9/6262 |
| 10,726,313 B2* | 7/2020 | Lee | ......................... | G06V 10/82 |
| 11,030,486 B2* | 6/2021 | Bagherinezhad | .... | G06V 10/454 |
| 11,074,500 B2* | 7/2021 | Volkova | ................ | G06F 40/211 |
| 11,334,766 B2* | 5/2022 | Li | ......................... | G06K 9/6259 |

(Continued)

OTHER PUBLICATIONS

Arazo et al., "Unsupervised Label Noise Modeling and Loss Correction," in ICML, pp. 312-321. 2019.

(Continued)

*Primary Examiner* — Jianxun Yang
(74) *Attorney, Agent, or Firm* — Haynes and Boone, LLP

(57) ABSTRACT

A method provides learning with noisy labels. The method includes generating a first network of a machine learning model with a first set of parameter initial values, and generating a second network of the machine learning model with a second set of parameter initial values. First clean probabilities for samples in a training dataset are generated using the second network. A first labeled dataset and a first unlabeled dataset are generated from the training dataset based on the first clean probabilities. The first network is trained based on the first labeled dataset and first unlabeled dataset to update parameters of the first network.

20 Claims, 14 Drawing Sheets

(56) References Cited

U.S. PATENT DOCUMENTS

| | | | |
|---|---|---|---|
| 2005/0234955 A1* | 10/2005 | Zeng | G06F 16/355 |
| 2016/0019459 A1* | 1/2016 | Audhkhasi | G06V 30/194 706/22 |
| 2016/0171977 A1* | 6/2016 | Siohan | G10L 15/20 704/237 |
| 2016/0350653 A1 | 12/2016 | Socher et al. | |
| 2017/0024645 A1 | 1/2017 | Socher et al. | |
| 2017/0032280 A1 | 2/2017 | Socher | |
| 2017/0140240 A1 | 5/2017 | Socher | |
| 2018/0082171 A1 | 3/2018 | Merity et al. | |
| 2018/0096219 A1 | 4/2018 | Socher | |
| 2018/0121787 A1 | 5/2018 | Hashimoto et al. | |
| 2018/0121788 A1 | 5/2018 | Hashimoto et al. | |
| 2018/0121799 A1 | 5/2018 | Hashimoto et al. | |
| 2018/0129931 A1 | 5/2018 | Bradbury et al. | |
| 2018/0129937 A1 | 5/2018 | Bradbury et al. | |
| 2018/0129938 A1 | 5/2018 | Xiong et al. | |
| 2018/0143966 A1 | 5/2018 | Lu et al. | |
| 2018/0144208 A1 | 5/2018 | Lu et al. | |
| 2018/0144248 A1 | 5/2018 | Lu et al. | |
| 2018/0150728 A1* | 5/2018 | Vahdat | G06N 3/0472 |
| 2018/0268287 A1 | 9/2018 | Johansen et al. | |
| 2018/0268298 A1 | 9/2018 | Johansen et al. | |
| 2018/0300317 A1 | 10/2018 | Bradbury | |
| 2018/0300400 A1 | 10/2018 | Paulus | |
| 2018/0336198 A1* | 11/2018 | Zhong | G06N 7/005 |
| 2018/0336453 A1* | 11/2018 | Merity | G06N 3/0445 |
| 2018/0349359 A1 | 12/2018 | McCann et al. | |
| 2018/0365562 A1* | 12/2018 | Volkova | G06F 40/211 |
| 2018/0373682 A1 | 12/2018 | McCann et al. | |
| 2018/0373987 A1 | 12/2018 | Zhang et al. | |
| 2019/0034766 A1* | 1/2019 | Chen | G06N 20/10 |
| 2019/0130206 A1 | 5/2019 | Trott et al. | |
| 2019/0130248 A1 | 5/2019 | Zhong et al. | |
| 2019/0130249 A1 | 5/2019 | Bradbury et al. | |
| 2019/0130273 A1 | 5/2019 | Keskar et al. | |
| 2019/0130312 A1 | 5/2019 | Xiong et al. | |
| 2019/0130896 A1* | 5/2019 | Zhou | G10L 15/16 |
| 2019/0130897 A1 | 5/2019 | Zhou et al. | |
| 2019/0149834 A1 | 5/2019 | Zhou et al. | |
| 2019/0188568 A1 | 6/2019 | Keskar et al. | |
| 2019/0213482 A1 | 7/2019 | Socher et al. | |
| 2019/0251168 A1 | 8/2019 | McCann et al. | |
| 2019/0251431 A1 | 8/2019 | Keskar et al. | |
| 2019/0258714 A1 | 8/2019 | Zhong et al. | |
| 2019/0258939 A1 | 8/2019 | Min et al. | |
| 2019/0286073 A1 | 9/2019 | Asl et al. | |
| 2019/0295530 A1 | 9/2019 | Asl et al. | |
| 2019/0311002 A1 | 10/2019 | Paulus | |
| 2019/0325269 A1* | 10/2019 | Bagherinezhad | G06T 11/60 |
| 2019/0325275 A1* | 10/2019 | Lee | G06V 30/194 |
| 2021/0089883 A1* | 3/2021 | Li | G06N 3/0454 |
| 2021/0150283 A1* | 5/2021 | Li | G06K 9/627 |
| 2021/0374553 A1* | 12/2021 | Li | G06V 10/774 |
| 2022/0067506 A1* | 3/2022 | Li | G06K 9/6262 |

OTHER PUBLICATIONS

Arpit et al., A Closer Look at Memorization in Deep Networks, in ICML, pp. 233-242. 2017.
Berthelot et al., "Mixmatch: A Holistic Approach to Semi-supervised Learning," NeurIPS, pp. 1-11, 2019.
Chen et al., "Understanding and Utilizing Deep Neural Networks Trained with Noisy Labels," In ICML, pp. 1062-1070. 2019.
Ding et al., "A Semi-supervised Two-stage Approach to Learning from Noisy Labels," In WACV, pp. 1215-1224, 2018.
Goldberger et al., "Training Deep Neural-networks using a Noise Adaptation Layer," In ICLR, pp. 1-9, 2017.
Grandvalet et al., "Semi-supervised Learning by Entropy Minimization," In NIPS, pp. 529-536, 2004.
Han et al., "Co-teaching: Robust Training of Deep Neural Networks with Extremely Noisy Labels," In NeurIPS, pp. 8536-8546, 2018.
He et al., "Identity Mappings in Deep Residual Networks," arXiv:1603.05027, pp. 1-15, 2016.
Hendrycks et al., "Using Trusted Data to Train Deep Networks on Labels Corrupted by Severe Noise," In NeurIPS, pp. 10477-10486, 2018.
Jiang et al., "Mentornet: Learning Datadriven Curriculum for Very Deep Neural Networks on Corrupted Labels," In ICML, pp. 2309-2318, 2018.
Kong et al., "Recycling: Semi-supervised Learning with Noisy Labels in Deep Neural Networks," IEEE Access, 7:66998-67005, 2019.
Krizhevsky et al., "Learning Multiple Layers of Features from Tiny Images," Mater's thesis, University of Toronto, 2009.
Kuznetsova et al., The Open Images Dataset v4: Unified Image Classification, Object Detection, and Visual Relationship Detection at Scale, arXiv:1811.00982, 2018.
Laine et al., "Temporal Ensembling for Semi-supervised Learning," In ICLR, 2017.
Lee, Pseudo-label: The Simple and Efficient Semi-supervised Learning Method for Deep Neural Networks. In ICML Workshop on Challenges in Representation Learning, vol. 3, pp. 2, 2013.
Lee et al., "Cleannet: Transfer Learning for Scalable Image Classifier Training with Label Noise," In CVPR, pp. 5447-5456. 2018.
Li et al., "Learning to Learn from Noisy Labeled Data," In CVPR, pp. 5051-5059, 2019.
Li et al., "Webvision Database: Visual Learning and Understanding from Web Data," arXiv:1708.02862, 2017a.
Li et al., "Learning from Noisy Labels with Distillation," In ICCV, pp. 1928-1936, 2017b.
Ma et al., "Dimensionality-driven Learning with Noisy Labels," In ICML, pp. 3361-3370, 2018.
Maaten et al., "Visualizing Data using t-sne," Journal of Machine Learning Research, 9:2579-2605, 2008.
Mahajan et al., "Exploring the Limits of Weakly Supervised Pretraining," In ECCV, pp. 185-201, 2018.
Malach et al., "Decoupling 'when to update' from 'how to update'," In NIPS. pp. 960-970, 2017.
Miyato et al., "Virtual Adversarial Training: A Regularization Method for Supervised and Semi-supervised Learning," IEEE Trans. Pattern Anal. Mach. Intell., 41(8):1979-1093, 2019.
Patrini et al., "Making Deep Neural Networks Robust to Label Noise: A Loss Correction Approach," In CVPR, pp. 2233-2241, 2017.
Pereyra et al., "Regularizing Neural Networks by Penalizing Confident Output Distributions," In ICLR Workshop, 2017.
Permuter et al., "A Study of Gaussian Mixture Models of Color and Texture Features for Image Classification and Segmentation," Pattern Recognition, 39(4): 695-706, 2006.
Reed et al., "Training Deep Neural Networks on Noisy Labels with Bootstrapping," In ICLR, 2015.
Ren et al., "Learning to Reweight Examples for Robust Deep Learning," In ICML, pp. 4331-4340, 2018.
Szegedy et al., "Inception-v4, Inception-resnet and the Impact of Residual Connections on Learning," In AAAI, pp. 4278-4284, 2017.
Tanaka et al., "Joint Optimization Framework for Learning with Noisy Labels," In CVPR, pp. 5552-5560, 2018.
Tanno et al., "Learning from Noisy Labels by Regularized Estimation of Annotator Confusion," In CVPR, 2019.
Tarvainen et al., "Mean Teachers are Better Role Models: Weight-averaged Consistency Targets Improve Semi-supervised Deep Learning Results," In NIPS, pp. 1195-1204, 2017.
Thulasidasan et al., "Combating Label Noise in Deep Learning using Abstention," In ICML, pp. 6234-6243, 2019.
Vahdat et al., "Toward Robustness against Label Noise in Training Deep Discriminative Neural Networks," NIPS, pp. 5601-5610, 2017.
Veit et al., "Learning from Noisy Large-scale Datasets with Minimal Supervision," In CVPR, pp. 6575-6583, 2017.
Wang et al., "Iterative Learning with Open-set Noisy Labels," In CVPR, pp. 8688-8696, 2018.
Xiao et al., "Learning from Massive Noisy Labeled Data for Image Classification," In CVPR, pp. 2691-2699, 2015.
Yi et al., Probabilistic End-to-End Noise Correction for Learning with Noisy Labels. In Cvpr, 2019.

(56) References Cited

OTHER PUBLICATIONS

Yu et al., "How does Disagreement Help Generalization against Label Corruption," In JCML, pp. 7164-7173, 2019.
Zhang et al., "Understanding Deep Learning Requires Rethinking Generalization," In ICLR, 2017.
Zhang et al., "Mixup: Beyond Empirical Risk Minimization," In ICLR, 2018.
Zhang et al., "Metacleaner: Learning to Hallucinate Clean Representations for Noisy-labeled Visual Recognition," In CVPR. 2019.

\* cited by examiner

Algorithm 1: DivideMix. Line 4-8: co-divide; Line 17-19: label co-refinement; Line 20: label co-guessing.

1: Input: $\theta^{(1)}$ and $\theta^{(2)}$, training dataset $(\mathcal{X},\mathcal{Y})$, clean probability threshold $\tau$, number of augmentations $M$, sharpening temperature $T$, unsupervised loss weight $\lambda$, Beta distribution parameter $\alpha$ for MixMatch.
2: $\theta^{(1)},\theta^{(2)} = \text{WarmUp}(\mathcal{X},\mathcal{Y},\theta^{(1)},\theta^{(2)})$
3: while not MaxEpoch do
4:   $\mathcal{W}^{(2)} = \text{GMM}(\mathcal{X},\mathcal{Y},\theta^{(1)})$    // model per-sample loss with $\theta^{(1)}$ to obtain clean probability for $\theta^{(2)}$
5:   $\mathcal{W}^{(1)} = \text{GMM}(\mathcal{X},\mathcal{Y},\theta^{(2)})$    // model per-sample loss with $\theta^{(2)}$ to obtain clean probability for $\theta^{(1)}$
6:   for $k = 1, 2$ do    // train the two networks one by one
7:     $\mathcal{X}^{(k)} = \{(x_i, y_i, w_i)|w_i \geq \tau, \forall(x_i, y_i, w_i) \in (\mathcal{X},\mathcal{Y},\mathcal{W}^{(k)})\}$    // labeled training set for $\theta^{(k)}$
8:     $\mathcal{U}^{(k)} = \{x_i|w_i < \tau, \forall(x_i, w_i) \in (\mathcal{X},\mathcal{W}^{(k)})\}$    // unlabeled training set for $\theta^{(k)}$
9:     for iter = 1 to num_iters do
10:       From $\mathcal{X}^{(k)}$, draw a mini-batch $\{(x_b, y_b, w_b); b \in (1,...,B)\}$
11:       From $\mathcal{U}^{(k)}$, draw a mini-batch $\{u_b; b \in (1,...,B)\}$
12:       for $b = 1$ to $B$ do
13:         for $m = 1$ to $M$ do
14:           $\hat{x}_{b,m} = \text{Augment}(x_b)$    // apply $m^{th}$ round of augmentation to $x_b$
15:           $\hat{u}_{b,m} = \text{Augment}(u_b)$    // apply $m^{th}$ round of augmentation to $u_b$
16:         end
17:         $p_b = \frac{1}{M}\sum_m p_{model}(\hat{x}_{b,m}; \theta^{(k)})$    // average the predictions across augmentations of $x_b$
18:         $\bar{y}_b = w_b y_b + (1-w_b) p_b$
          // refine ground-truth label guided by the clean probability produced by the other network
19:         $\hat{y}_b = \text{Sharpen}(\bar{y}_b, T)$    // apply temperature sharpening to the refined label
20:         $\bar{q}_b = \frac{1}{2M}\sum_m (p_{model}(\hat{u}_{b,m};\theta^{(1)}) + p_{model}(\hat{u}_{b,m};\theta^{(2)}))$
          // co-guessing: average the predictions from both networks across augmentations of $u_b$
21:         $\hat{q}_b = \text{Sharpen}(\bar{q}_b, T)$    // apply temperature sharpening to the guessed label
22:       end
23:       $\hat{\mathcal{X}} = \{(\hat{x}_{b,m}, \hat{y}_b); b \in (1,...,B), m \in (1,...,M)\}$    // augmented labeled mini-batch
24:       $\hat{\mathcal{U}} = \{(\hat{u}_{b,m}, \hat{q}_b); b \in (1,...,B), m \in (1,...,M)\}$    // augmented unlabeled mini-batch
25:       $\mathcal{L}_{\mathcal{X}}, \mathcal{L}_{\mathcal{U}} = \text{MixMatch}(\hat{\mathcal{X}}, \hat{\mathcal{U}})$    // apply MixMatch
26:       $\mathcal{L} = \mathcal{L}_{\mathcal{X}} + \lambda \mathcal{L}_{\mathcal{U}} + \mathcal{L}_{reg}$    // total loss
27:       $\theta^{(k)} = \text{SGD}(\mathcal{L}, \theta^{(k)})$    // update model parameters
28:     end
29:   end
30: end

FIG. 5

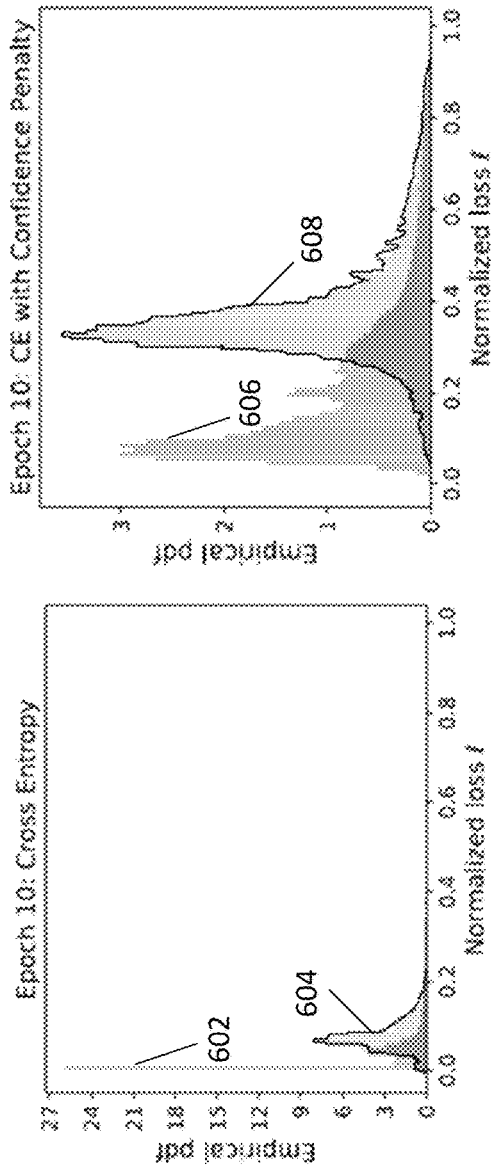
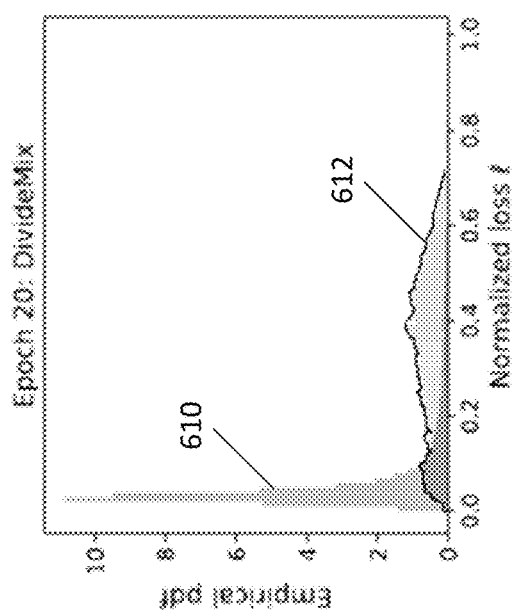
FIG. 6A
FIG. 6B
FIG. 6C

| Dataset | | CIFAR-10 | | | | CIFAR-100 | | | |
|---|---|---|---|---|---|---|---|---|---|
| Method/Noise ratio | | 20% | 50% | 80% | 90% | 20% | 50% | 80% | 90% |
| Cross-Entropy | Best | 86.8 | 79.4 | 62.9 | 42.7 | 62.0 | 46.7 | 19.9 | 10.1 |
| | Last | 82.7 | 57.9 | 26.1 | 16.8 | 61.8 | 37.3 | 8.8 | 3.5 |
| Bootstrap (Reed et al., 2015) | Best | 86.8 | 79.8 | 63.3 | 42.9 | 62.1 | 46.6 | 19.9 | 10.2 |
| | Last | 82.9 | 58.4 | 26.8 | 17.0 | 62.0 | 37.9 | 8.9 | 3.8 |
| F-correction (Patrini et al., 2017) | Best | 86.8 | 79.8 | 63.3 | 42.9 | 61.5 | 46.6 | 19.9 | 10.2 |
| | Last | 83.1 | 59.4 | 26.2 | 18.8 | 61.4 | 37.3 | 9.0 | 3.4 |
| Co-teaching+* (Yu et al., 2019) | Best | 89.5 | 85.7 | 67.4 | 47.9 | 65.6 | 51.8 | 27.9 | 13.7 |
| | Last | 88.2 | 84.1 | 45.5 | 30.1 | 64.1 | 45.3 | 15.5 | 8.8 |
| Mixup (Zhang et al., 2018) | Best | 95.6 | 87.1 | 71.6 | 52.2 | 67.8 | 57.3 | 30.8 | 14.6 |
| | Last | 92.3 | 77.6 | 46.7 | 43.9 | 66.0 | 46.6 | 17.6 | 8.1 |
| P-correction* (Yi & Wu, 2019) | Best | 92.4 | 89.1 | 77.5 | 58.9 | 69.4 | 57.5 | 31.1 | 15.3 |
| | Last | 92.0 | 88.7 | 76.5 | 58.2 | 68.1 | 56.4 | 20.7 | 8.8 |
| Meta-Learning* (Li et al., 2019) | Best | 92.9 | 89.3 | 77.4 | 58.7 | 68.5 | 59.2 | 42.4 | 19.5 |
| | Last | 92.0 | 88.8 | 76.1 | 58.3 | 67.7 | 58.0 | 40.1 | 14.3 |
| M-correction (Arazo et al., 2019) | Best | 94.0 | 92.0 | 86.8 | 69.1 | 73.9 | 66.1 | 48.2 | 24.3 |
| | Last | 93.8 | 91.9 | 86.6 | 68.7 | 73.4 | 65.4 | 47.6 | 20.5 |
| 700 → DivideMix | Best | 96.1 | 94.6 | 93.2 | 76.0 | 77.3 | 74.6 | 60.2 | 31.5 |
| | Last | 95.7 | 94.4 | 92.9 | 75.4 | 76.9 | 74.2 | 59.6 | 31.0 |

*FIG. 7*

| Method | Test Accuracy |
|---|---|
| Cross-Entropy | 69.21 |
| F-correction (Patrini et al., 2017) | 69.84 |
| M-correction (Arazo et al., 2019) | 71.00 |
| Joint-Optim (Tanaka et al., 2018) | 72.16 |
| Meta-Cleaner (Zhang et al., 2019) | 72.50 |
| Meta-Learning (Li et al., 2019) | 73.47 |
| P-correction (Yi & Wu, 2019) | 73.49 |
| DivideMix | 74.76 |

| Method | WebVision | ILSVRC12 |
|---|---|---|
| F-correction (Patrini et al., 2017) | 61.12 (82.68) | 57.36 (82.36) |
| Decoupling (Malach & Shalev-Shwartz, 2017) | 62.54 (84.74) | 58.26 (82.26) |
| D2L (Ma et al., 2018) | 62.68 (84.00) | 57.80 (81.36) |
| MentorNet (Jiang et al., 2018) | 63.00 (81.40) | 57.80 (79.92) |
| Co-teaching (Han et al., 2018) | 63.58 (85.20) | 61.48 (84.70) |
| Iterative-CV (Chen et al., 2019) | 65.24 (85.34) | 61.60 (84.98) |
| DivideMix | 77.32 (91.64) | 75.20 (90.84) |

*FIG. 10*

| Dataset | | CIFAR-10 | | | | CIFAR-100 | | | |
|---|---|---|---|---|---|---|---|---|---|
| Noise type | | Asym. | Sym. | | | Sym. | | | |
| Method/Noise ratio | | 40% | 20% | 50% | 80% | 20% | 50% | 80% | 90% |
| DivideMix (1102) | Best | 93.4 | 96.1 | 94.6 | 93.2 | 77.3 | 74.6 | 60.2 | 31.5 |
| | Last | 92.1 | 95.7 | 94.4 | 92.9 | 76.9 | 74.2 | 59.6 | 31.0 |
| DivideMix with $p(1)$ test (1104) | Best | 92.7 | 95.2 | 94.2 | 93.0 | 75.2 | 72.8 | 58.3 | 29.9 |
| | Last | 91.4 | 95.0 | 93.7 | 92.4 | 74.8 | 72.1 | 57.6 | 29.2 |
| DivideMix w/o co-training (1106) | Best | 91.9 | 95.0 | 94.0 | 92.6 | 74.8 | 72.3 | 56.7 | 27.7 |
| | Last | 90.6 | 94.8 | 93.3 | 92.2 | 74.1 | 71.7 | 56.3 | 27.2 |
| DivideMix w/o label refinement (1108) | Best | 87.7 | 96.0 | 94.6 | 93.0 | 76.9 | 74.2 | 58.7 | 26.9 |
| | Last | 86.3 | 95.5 | 94.2 | 92.7 | 76.4 | 73.9 | 58.2 | 26.3 |
| DivideMix w/o augmentation (1110) | Best | 89.5 | 95.3 | 94.1 | 92.2 | 76.5 | 73.1 | 58.2 | 26.9 |
| | Last | 88.4 | 94.9 | 93.5 | 91.8 | 76.2 | 72.6 | 58.0 | 26.4 |
| Divide and MixMatch (1112) | Best | 86.5 | 94.1 | 92.8 | 89.7 | 73.7 | 70.5 | 55.3 | 25.0 |
| | Last | 85.2 | 93.5 | 92.3 | 89.1 | 72.4 | 69.7 | 53.9 | 23.7 |

*FIG. 11*

| Method | Architecture | CIFAR-10 | | | | CIFAR-100 | | | |
|---|---|---|---|---|---|---|---|---|---|
| | | 20% | 40% | 60% | 80% | 20% | 40% | 60% | 80% |
| MentorNet (Jiang et al., 2018) | WRN-101 | 92.0 | 89.0 | - | 49.0 | 73.0 | 68.0 | - | 35.0 |
| D2L (Ma et al., 2018) | CNN-12/RN-44 | 85.1 | 83.4 | 72.8 | - | 62.2 | 52.0 | 42.3 | - |
| Reweight (Ren et al., 2018) | WRN-28 | 86.9 | - | - | - | 61.3 | - | - | - |
| Abstention (Thulasidasan et al., 2019) | WRN-28 | 93.4 | 90.9 | 87.6 | 70.8 | 75.8 | 68.2 | 59.4 | 34.1 |
| DivideMix | PRN-18 | 96.2 | 94.9 | 94.3 | 79.8 | 77.2 | 75.2 | 72.0 | 60.0 |

*FIG. 12*

| Hyperparameter | CIFAR-10 | | | | | CIFAR-100 | | | |
|---|---|---|---|---|---|---|---|---|---|
| | Asym. 40% | 20% | 50% | 80% | 90% | 20% | 50% | 80% | 90% |
| λ | 0 | 25 | 25 | 25 | 50 | 25 | 150 | 150 | 150 |

*FIG. 13*

SYSTEM AND METHOD FOR LEARNING WITH NOISY LABELS AS SEMI-SUPERVISED LEARNING

RELATED APPLICATIONS

This application claims priority to U.S. Provisional Patent Application No. 62/905,055 filed Sep. 24, 2019, which is incorporated by reference herein in its entirety.

TECHNICAL FIELD

The present disclosure relates generally to neural networks and more specifically to training neural networks by learning with noisy labels as semi-supervised learning.

BACKGROUND

The remarkable success in training deep neural networks (DNNs) is largely attributed to the collection of large datasets with human annotated labels. However, it is extremely expensive and time-consuming to label extensive data with high-quality annotations. On the other hand, there exist alternative and inexpensive methods for mining large-scale data with labels. However, these alternative and inexpensive methods usually yield samples with noisy labels, and DNNs can easily overfit to noisy labels and results in poor generalization performance.

Accordingly, it would be advantageous to develop systems and methods for improved learning with noisy labels.

BRIEF DESCRIPTION OF THE DRAWINGS

FIG. 5 is an example pseudocode for implementing the method of FIG. 2 according to some embodiments;

FIGS. 6A, 6B, and 6C illustrate comparison of normalized loss over clean and noisy samples without and with a confidence penalty.

FIG. 7 illustrates comparison of DividMix training with other training methods on various training datasets with different levels of synthetic symmetric label noise according to some embodiments.

FIG. 9 illustrates comparison of DividMix training with other training methods on another training dataset with real world label noise according to some embodiments.

FIG. 10 illustrates comparison of DividMix training with other training methods on more training datasets according to some embodiments.

FIG. 11 illustrates comparison of various configurations of DividMix according to some embodiments.

FIG. 12 illustrates comparison of DividMix training with more training methods on various training datasets according to some embodiments.

FIG. 13 illustrates various hyperparameter configurations for various training datasets with different noise ratio according to some embodiments.

In the figures, elements having the same designations have the same or similar functions.

DETAILED DESCRIPTION

Figure 1:
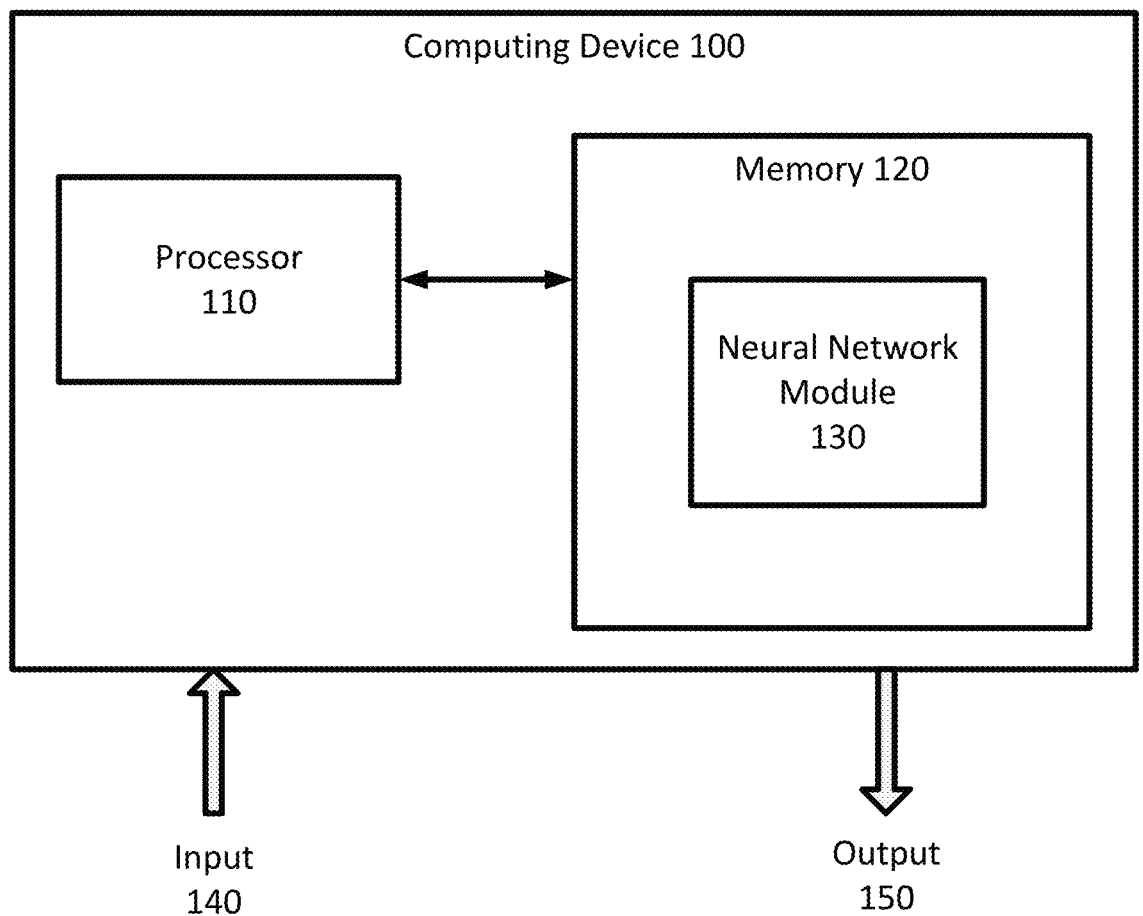
FIG. 1 is a simplified diagram of a computing device according to some embodiments.

FIG. 1 is a simplified diagram of a computing device 100 according to some embodiments. As shown in FIG. 1, computing device 100 includes a processor 110 coupled to memory 120. Operation of computing device 100 is controlled by processor 110. And although computing device 100 is shown with only one processor 110, it is understood that processor 110 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 100. Computing device 100 may be implemented as a stand-alone subsystem, as a board added to a computing device, and/or as a virtual machine.

Memory 120 may be used to store software executed by computing device 100 and/or one or more data structures used during operation of computing device 100. Memory 120 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 110 and/or memory 120 may be arranged in any suitable physical arrangement. In some embodiments, processor 110 and/or memory 120 may be implemented on a same board, in a same package (e.g., system-in-package), on a same chip (e.g., system-on-chip), and/or the like. In some embodiments, processor 110 and/or memory 120 may include distributed, virtualized, and/or containerized computing resources. Consistent with such embodiments, processor 110 and/or memory 120 may be located in one or more data centers and/or cloud computing facilities.

As shown, memory 120 includes a neural network module 130 that may be used to implement and/or emulate the neural network systems and models described further herein and/or to implement any of the methods described further herein. In some examples, neural network module 130 may be used to translate structured text. In some examples, neural network module 130 may also handle the iterative training and/or evaluation of a translation system or model used to translate the structured text. In some examples, memory 120 may include non-transitory, tangible, machine readable media that includes executable code that when run by one or more processors (e.g., processor 110) may cause the one or more processors to perform the counting methods described in further detail herein. In some examples, neural network module 130 may be implemented using hardware, software, and/or a combination of hardware and software. As shown, computing device 100 receives input 140, which is provided to neural network module 130, neural network module 130 then generates output 150.

Figure 2:
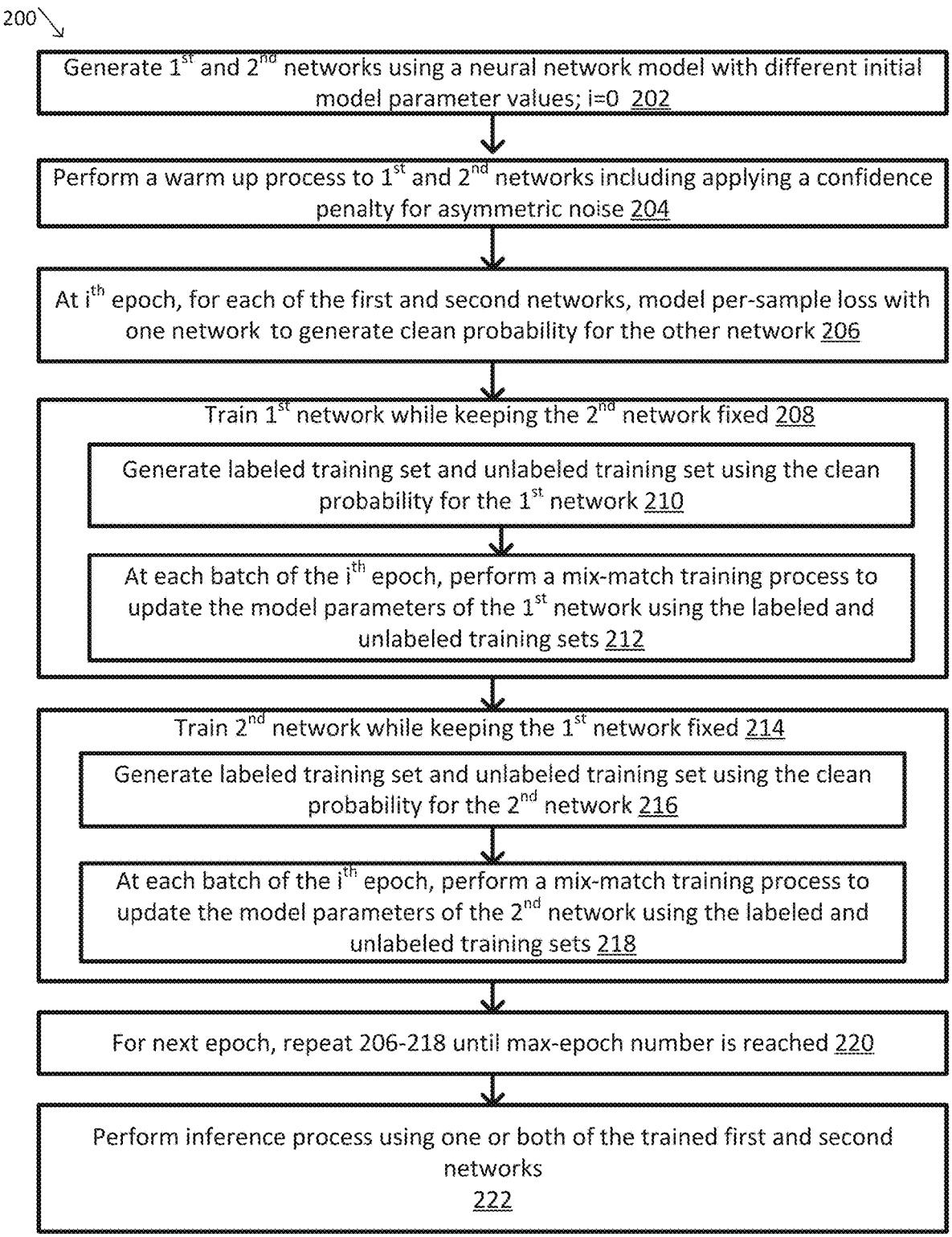
FIG. 2 is a simplified diagram of a method of training a neural network model according to some embodiments.

FIG. 2 is a simplified diagram of a method 200 for training a neural network model by learning with noisy labels as semi-supervised learning and performing a task using the trained neural network model according to some embodiments. One or more of the processes 202-222 of method 200 may be implemented, at least in part, in the form of executable code stored on non-transitory, tangible, machine-readable media that when run by one or more processors may cause the one or more processors to perform one or more of the processes 202-222. In some embodiments, the method 200 may correspond to the method used by neural network module 130 to perform training and/or perform inference using the trained neural network model for various tasks (e.g., classification, prediction, diagnoses and prediction on medical diseases, image recognition, natural language processing, etc.).

The method 200 performs learning with label noise in a semi-supervised manner. Different from conventional learning with noisy labels (LNL) approaches, the method 200 identifies noisy samples that have noisy labels, discards those noisy labels for those noisy samples, and leverages those noisy samples as unlabeled data to regularize the neural network model from overfitting and improve generalization performance.

In various embodiments, the method 200 uses a co-divide process to avoid confirmation bias in self-training. At each epoch of the training process, a co-divide process is applied, where two networks of the same neural network model (e.g., with different initial model parameter values) are trained. During the co-divide process, for each network, a Gaussian Mixture Model (GMM) is dynamically fit on per-sample loss distribution to divide the training samples into a labeled set (e.g., including samples that are mostly clean/less likely to be noisy) and an unlabeled set (e.g., including samples that are highly likely to be noisy). The divided data (including the labeled set and unlabeled set) from one network is then used to train the other network. By using the co-divide process, the two networks are kept diverged, and may be used to filter different types of error and avoid confirmation bias in self-training. In each epoch, the first network is trained while keeping the second network fixed, and the second network is then trained while keeping the first network fixed.

The method 200 may also use a mix-match process to train the particular network at each of the plurality batches of the epoch. The mix-match process may include label co-refinement and co-guessing using the other network. For example, during the label co-refinement process, for labeled samples, the ground-truth labels are refined using that predictions of the particular network under training guided by the GMM for the other network. For further example, during the co-guessing process, for unlabeled samples, the ensemble of both networks are used to make reliable guesses for labels of those unlabeled samples. In the description below, the method 200 also referred to as the DivideMix method.

The method 200 begins at block 202, where a processor performs initialization for training a neural network model. At block 202, the method 200 may receive various inputs. For example, the inputs may include two sets of initial model parameter values. At block 202, two networks may be generated using the neural network model with the different sets of initial model parameter values. The inputs may also receive the training dataset (X, Y), where X is the sample and Y is the corresponding label, a clean probability threshold $\tau$, number of augmentations M, sharpening temperature T, unsupervised loss weight $\lambda$, Beta distribution parameter $\alpha$ for a mix-match process, maximum epoch number, and any other suitable training parameters. At block 202, an epoch index i may be initialized to zero.

The method 200 may proceed to block 204, where the processor may perform a warm up process to the two networks to update the model parameters. In some embodiments, the warm up process is performed on the two networks for a few (e.g., 3-5) epochs by training on all data of the dataset using a cross-entropy loss. A cross-entropy loss $l(\theta)$ may be used to indicate how well the model fits the training samples. In some examples, a standard cross-entropy loss may be determined as follows:

$$\ell(\theta) = \{\ell_i\}_{i=1}^N = \left\{ -\sum_{c=1}^C y_i^c \log(p_{model}^c(x_i;\theta)) \right\}_{i=1}^N, \quad (1)$$

where $p_{model}^c$ is the model's output softmax probability for class c, $D=(X, Y)=\{(x_i,y_i)\}_{i=1}^N$ denotes the training data, $x_i$ is a sample (e.g., an image), and $y_i \in \{0, 1\}^c$ is the one-hot label over C classes, $\theta$ denotes the model parameters.

However, while the warm up process using the standard cross-entropy loss as computed using equation (1) may be effective for symmetric (e.g., uniformly random) label noise, such a warm up process may not be effective for asymmetric (e.g. class-conditional) label noise and the networks may quickly overfit to noise during warm up and produce overconfident (low entropy) predictions. This may lead to most samples having near-zero normalized loss, which will be discussed in detail below with reference to FIG. 6A. In such cases, a mixture model (e.g., GMM) may not effectively distinguish clean and noisy samples based on the loss distribution.

To address this issue, at block 204, the warm up process may apply a confidence penalty for asymmetric noise, for example, by adding a negative entropy term, -H, to the cross-entropy loss $l(\theta)$ (e.g., as computed according to equation (1)) during warm up. An example of the entropy term H, which is a model's prediction for an input x is provided as follows:

$$\mathcal{H} = -\sum_c p_{model}^c(x;\theta) \log(p_{model}^c(x;\theta)), \quad (2)$$

By applying the negative entropy term, the entropy is maximized, and $l(\theta)$ is more evenly distributed and easier to be modeled by a mixture model, which may significantly reduce the loss for clean samples while keeping the loss larger for most noisy samples. Such improvement will be discussed in more detail with reference to FIGS. 6B and 6C.

The method 200 may proceed to block 206, where at a particular epoch (e.g., $i^{th}$ epoch), for each of the first and second networks, per-sample loss is modeled with one network to obtain clean probability for the other network, which will be used to generate labeled training set and unlabeled training set for that other network. For example, the per-sample loss of the first network with first set of parameters $\theta^{(1)}$ may be modeled using a mixture model (e.g., a GMM model) to obtain clean probability $W^{(2)}$ for the second network with second set of parameters $\theta^{(2)}$. For further example, the per-sample loss of the second network with second set of parameters $\theta^{(2)}$ may be modeled using a mixture model (e.g., a GMM model) to obtain clean probability $W^{(1)}$ for the first network with first set of parameters $\theta^{(1)}$. In some examples, a two-component GMM is fitted to the loss $l(\theta)$ (e.g., with a confidence penalty for asymmetric noise) using the Expectation-Maximization algorithm. For each sample, its clean probability $w_i$ is the posterior probability $p(g|l_i)$, where g is the Gaussian component with smaller mean (smaller loss). The clean probabilities $W^{(2)}$ and $W^{(1)}$ for the samples for the second and first networks respectively may be computed as follows:

$$W^{(2)} = GMM(X, Y, \theta^{(1)}); \quad (3)$$

$$W^{(1)} = GMM(X, Y, \theta^{(2)}). \quad (4)$$

It is noted that while in the samples the same mixture model (e.g., GMM) is used for modeling per-sample loss of both networks, in alternative embodiments, different mixture models may be used for per-sample loss of the two networks respectively.

The method 200 may proceed to block 208, where the first network (the neural network model with parameters $\theta^{(1)}$ is trained while the second network (the neural network model with parameters $\theta^{(2)}$ is fixed. Block 208 may include process 210, where labeled training set and unlabeled training set are generated from the training set based on the clean probability $W^{(1)}$ for the first network. In an example, the labeled training set $X^{(1)}$ and unlabeled training set $U^{(1)}$ may be generated as follows:

$$X^{(1)} = \{(x_i, y_i, w_i) | w_i \geq \tau, \forall (x_i, y_i, w_i) \in (X, Y, W^{(1)})\} U^{(1)}$$
$$= \{x_i | w_i < \tau, \forall (x_i, w_i) \in (X, W^{(1)})\} \quad (5)$$

where $\tau$ is the clean probability threshold. As such, the labeled training set $X^{(1)}$ includes clean samples (and their labels) each having a clean probability equal to or greater than the clean probability threshold $\tau$. The unlabeled training set $U^{(1)}$ includes dirty samples (without labels) each having a clean probability less than the clean probability threshold $\tau$.

Block 208 may include process 212, where at each batch of the $i^{th}$ epoch, a mix-match training process is performed to update the model parameters $\theta^{(1)}$ of the first network using the labeled and unlabeled training sets generated at process 210. An example mix-match process is described in detail below with reference to FIG. 4.

The method 200 may proceed to block 214, where the second network (the neural network model with parameters $\theta^{(2)}$ is trained while the first network (the neural network model with parameters $\theta^{(1)}$ is fixed. Block 214 may be substantially similar to block 208 except that the second network is trained while the first network is fixed. For example, block 214 may include process 216 substantially similar to block 210, where at process 216, where labeled training set $X^{(2)}$ and unlabeled training set $U^{(2)}$ are generated from the training set based on the clean probability $W^{(2)}$ for the second network (e.g., substantially similar to equation (5)). For further example, block 214 includes process 218, where at each batch of the $i^{th}$ epoch, a mix-match training process is performed to update the model parameters $\theta^{(2)}$ of the second network using the labeled and unlabeled training sets generated at process 216. An example mix-match process described in detail below with reference to FIG. 4 may be used at block 218.

The method 200 may proceed to block 220, where blocks 206-218 are repeated to train the first and second networks for the $(i+1)^{th}$ epoch, if i+1 is less than a predefined maximum epoch number. Otherwise if i+1 has reached the predefined maximum epoch number, the training process ends.

The method 200 may proceed to block 222, where one or more of the trained networks are deployed to perform an inference process for a particular task (e.g., classification, prediction, diagnoses and prediction on medical diseases, image recognition, natural language processing, etc.). In some embodiments, a single trained network (e.g., the first trained network or the second trained network) is provided to be deployed to perform the task. In some embodiments, both trained first and second networks are provided to be deployed to perform the task. In some examples, a prediction result is an average of the outputs of the trained first and second networks for a particular input data.

Figure 3:
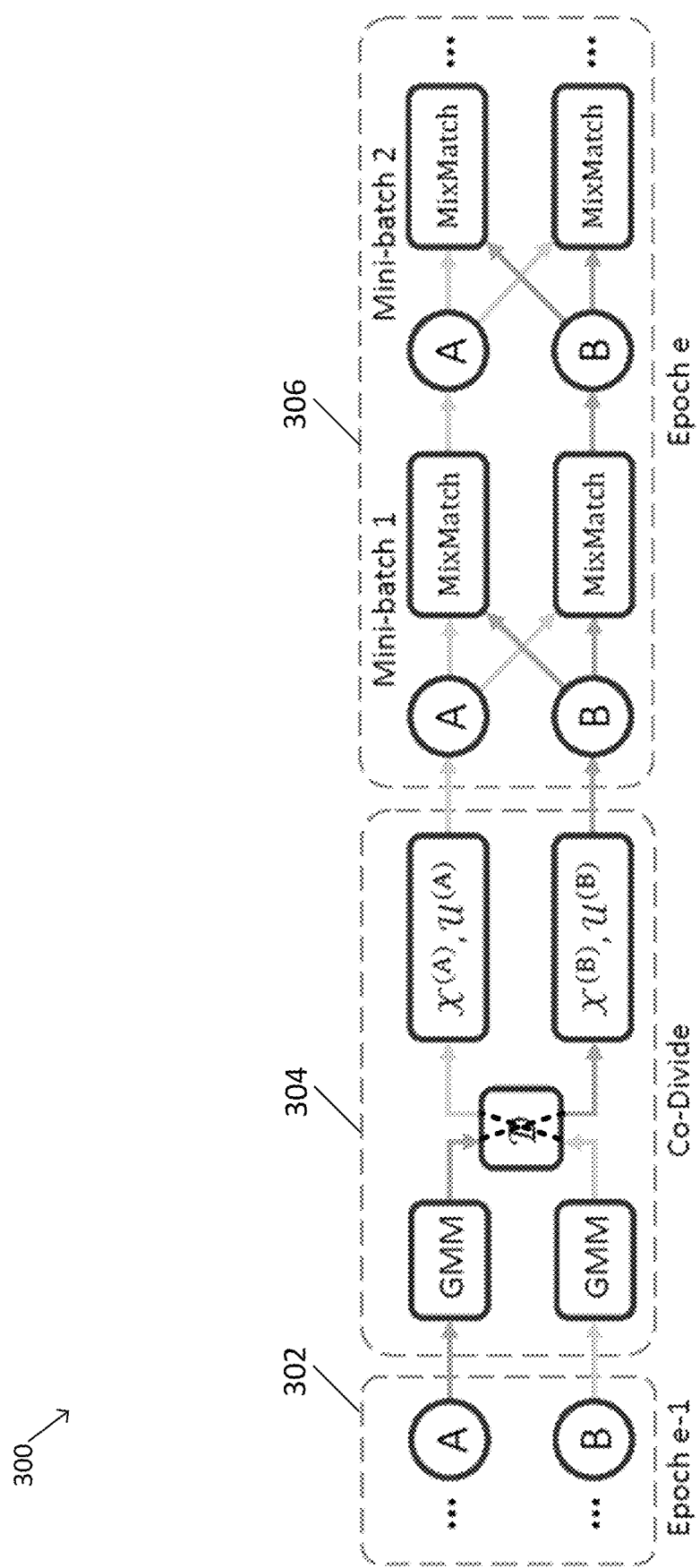
FIG. 3 is a simplified diagram illustrating the dataflow of the method of FIG. 2 according to some embodiments.

Referring to FIG. 3, illustrated therein is example dataflow 300 of a portion of the DivideMix method 200 of FIG. 2 for training a neural network model. As shown in the example of FIG. 3, the DivideMix method trains first network A and second network B, which are generated using the same neural network model with different parameter initialization values. The dataflow 300 includes a last epoch unit 302, where at epoch e-1, first network A and second network B are trained to provide trained parameters $\theta^{(1)}$ and $\theta^{(2)}$ respectively. A co-divide unit 304 is coupled to the last epoch unit 302. At the co-divide unit 304, first network A models its per-sample loss distribution with a GMM, and generates clean probability $W^{(2)}$ for second network B, which used to divide the dataset into a labeled set (mostly clean) $X^{(B)}$ and an unlabeled set (mostly noisy) $U^{(B)}$, which is then used as training data for second network B. Similarly, second network B models its per-sample loss distribution with a GMM, and generates clean probability $W^{(1)}$ for the first network A, which is used to divide the dataset into a labeled set (mostly clean) $X^{(A)}$ and an unlabeled set (mostly noisy) $U^{(A)}$, which is then used as training data for first network A.

The dataflow 300 further includes a current epoch unit 306 coupled to the co-divide unit 304. In the current epoch unit 306, at each batch (also referred to as mini-batch) of the epoch e, each of first network A and second network B performs semi-supervised training using a mix-match method. During the mix-match method, label co-refinement on the labeled samples and label co-guessing are performed on the unlabeled samples, where co-refinement and co-guessing use information from both first network A and second network B.

Figure 4:
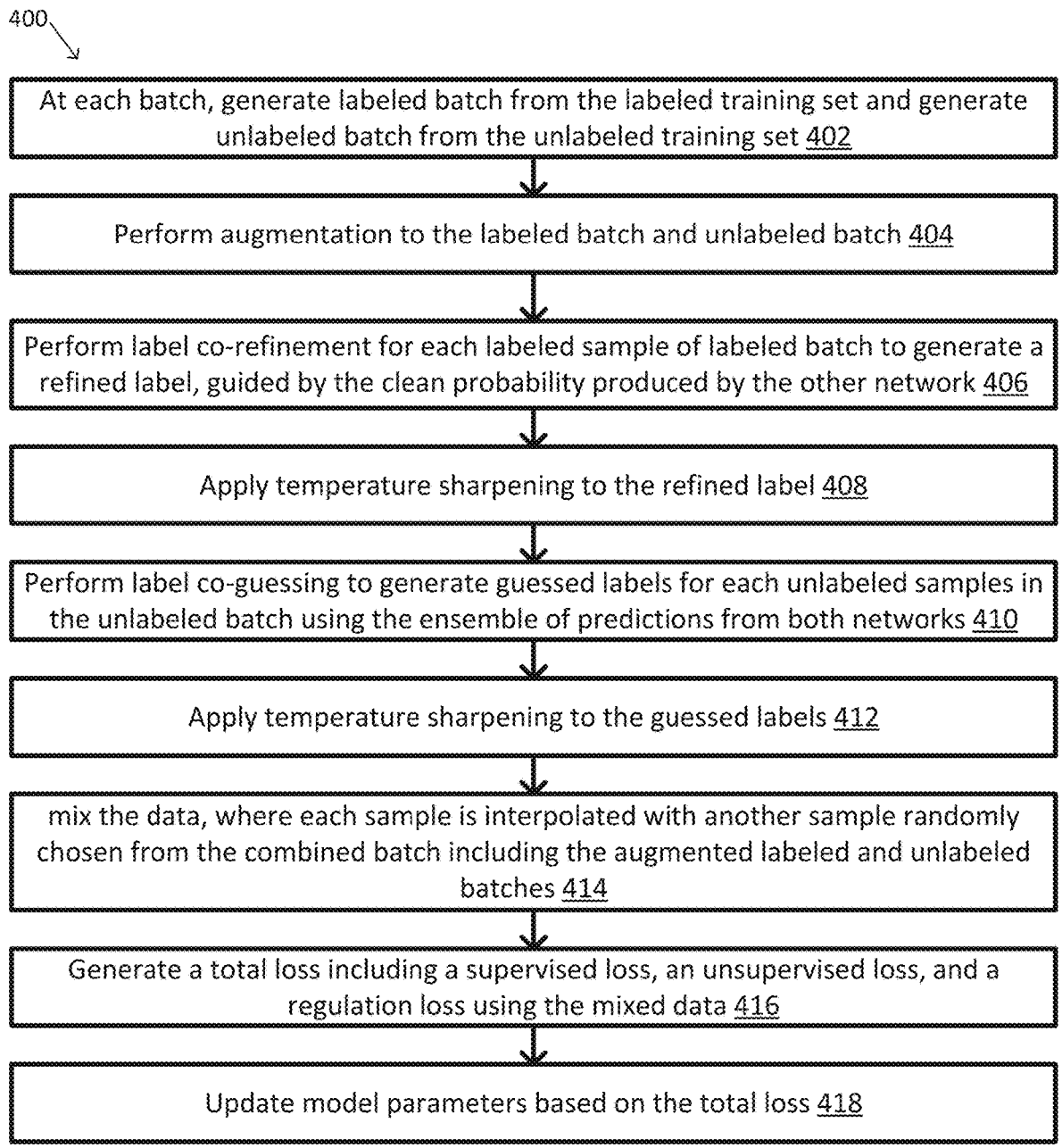
FIG. 4 is a simplified diagram of a method of a mix-match process during the training of the neural network model according to some embodiments.

Referring to FIG. 4, an example mix-match method 400 (e.g., mix-match methods 212, 218 of FIG. 2) is illustrated. In various embodiments, the mix-match process may use unlabeled data by merging consistency regularization (e.g., to encourage the neural network to output same predictions on perturbed unlabeled data), and entropy minimization (i.e., to encourage the neural network to output confident predictions on unlabeled data) with mixed augmentation (e.g., to encourage the neural network to have linear behavior between samples).

The method 400 begins at block 402, where at each batch of a training epoch, a labeled batch is generated from the labeled training set (e.g., $X^{(1)}$ generated at block 210, $X^{(2)}$ generated at block 216) and an unlabeled batch is generated from the unlabeled training set (e.g., $U^{(1)}$ generated at block 210, $U^{(2)}$ generated at block 216).

At block 404, argumentation process may be performed to the labeled batch and unlabeled batch. At block 406, a label co-refinement process is performed for each labeled sample of the labeled batch. The label co-refinement process generates a refined label guided by the clean probability of the network under training, which is generated using the other network. For example, a refined label may be generated by linearly combining the ground-truth label $y_b$ with the network's prediction $p_b$ (averaged across multiple augmentations of $X_b$), guided by the clean probability $w_b$ (e.g., produced by the other network). The refined label may be generated as follows:

$$\bar{y}_b = w_b y_b + (1-w_b) p_b.$$

At block 408, a temperature sharpening process is applied to the refined label, e.g., using the sharpening temperature T, to reduce it temperature. An example sharpen function is provided as follows:

$$\hat{y}_b = \text{Sharpen}(\bar{y}_b, T) = \bar{y}_b^{\frac{1}{T}} / \sum_{c=1}^{C} \bar{y}_b^{\frac{1}{T}}, \text{ for } c = 1, 2, \ldots, C.$$

At block 412, a label co-guessing process is performed for each sample of the unlabeled batch. The label co-guessing process generates a guessed label using the ensemble of predictions for both first and second networks (e.g., by averaging the predictions from both networks across augmentations of the unlabeled sample of the unlabeled batch). The guessed label may be generated as follows:

$$\bar{q}_b = \frac{1}{2M} \sum_m (p_{model}(\hat{u}_{b,m}; \theta^{(1)}) + p_{model}(\hat{u}_{b,m}; \theta^{(2)})).$$

At block 414, a temperature sharpening process is applied to the guessed label, e.g., using the sharpening temperature T.

At block 416, labeled samples (with refined labels) and unlabeled samples (with guessed labels) are mixed to generate mixed data for each of the augmented labeled batch and augmented unlabeled batch to generate mixed augmented labeled batch X' (also referred to as mixed labeled batch) and mixed augmented unlabeled batch U' (also referred to as mixed unlabeled batch) respectively. For example, for each of the augmented labeled batch and augmented unlabeled batch, each sample is interpolated with another sample randomly chosen from the combined batch of augmented labeled batch $\hat{X}$ and unlabeled batch $\hat{U}$. For example, for a pair of samples (x1, x2) of $\hat{X}$ (or samples (u1, u2) of batch $\hat{U}$) and their corresponding refined labels (p1, p2) (or corresponding guessed labels (p1, p2) of batch $\hat{U}$), the mixed (x', p') (or (u', p')) is computed by:

$$\lambda \sim \text{Beta}(\alpha, \alpha),$$

$$\lambda' = \max(\lambda, 1-\lambda),$$

$$X' = \lambda' x_1 + (1-\lambda') x_2,$$

$$p' = \lambda' p_1 + (1-\lambda') p_2.$$

At block 418, a total loss is generated using the mixed data. The total loss L may include a supervised loss $L_X$, an unsupervised loss $L_U$, and a regulation loss Lreg. An example supervised loss includes the cross-entropy loss and may be computed as follows:

$$\mathcal{L}_X = -\frac{1}{|X'|} \sum_{x,p \in X'} \sum_c p_c \log(p_{model}^c(x;\theta)).$$

An example unsupervised loss includes a mean squared error and may be computed as follows:

$$\mathcal{L}_U = \frac{1}{|U'|} \sum_{x,p \in U'} \|p - p_{model}(x;\theta)\|_2^2.$$

An example regulation loss may be computed as follows:

$$\mathcal{L}_{reg} = \sum_c \pi_c \log\left(\pi_c / \frac{1}{|X'|+|U'|} \sum_{x \in X'+U'} p_{model}^c(x;\theta)\right),$$

where $\pi$ is a uniform prior distribution, and $\pi_c = 1/C$.

The total loss L may be computed as:

$$\mathcal{L} = \mathcal{L}_X + \lambda \mathcal{L}_U + \mathcal{L}_{reg},$$

where $\lambda$ is an unsupervised loss weight.

At block 418, the parameters of the neural network are updated based on the total loss L (e.g., using gradient descent).

Referring to FIG. 5, an example pseudocode for algorithm 500 for implementing the methods of FIG. 2 and FIG. 4 is illustrated. At line 1 of algorithm 500, various inputs are received. At line 2, a warm up process (e.g., block 204 of FIG. 2) is performed. At lines 4-8, a co-divide method is performed to generate labeled set and unlabeled set based on clean probability generated by the other network. At lines 13-16, augmentation process is applied to each of the samples in the labeled batch and unlabeled batch. At lines 17-18, label co-refinement is performed. At line 19, temperature sharpening is performed to the refined labels. At line 20, label co-guessing is performed. At line 21, temperature sharpening is performed to the guessed labels. At lines 23 to 26, a total loss is computed using mixed data from the augmented labeled batch and the augmented unlabeled batch at line 27, the parameters of the neural network are updated using the loss (e.g., using stochastic gradient descent).

Referring to FIGS. 6A, 6B, and 6C, performance improvement by applying a confidence penalty during warm up process is illustrated. In each of the examples of FIGS. 6A, 6B, and 6C, a warm up process is performed during training for a neural network model for 10 epochs using a CIFAR-10 training dataset with 40% asymmetric noise. In FIG. 6A, a standard training (e.g., without divide-mix) with standard cross-entropy loss without a confidence penalty is performed. As shown by curves 602 and 604 for clean samples and noisy samples respectively, such a standard training causes the model to overfit, and produce overconfident predictions. As such, it is difficult to model the loss by the GMM.

In FIG. 6B, a standard training (e.g., without divide-mix) with standard cross-entropy loss with a confidence penalty is performed. As shown by curves 606 and 606 for clean samples and noisy samples respectively, adding a confidence penalty (negative entropy) during warm up leads to more evenly-distributed loss, which is easier to be modeled by the mixture model GMM. In FIG. 6C, the neural network model is trained with DivideMix for 10 more epochs after warm up of FIG. 6B, and the DivideMix method significantly reduces the loss for clean samples while keeping the loss larger for most noisy samples.

Referring to FIG. 7, illustrated is comparison of the DivideMix method (e.g., method 200) with state-of-the-art methods in test accuracy (%) on CIFAR-10 and CIFAR-100 datasets with symmetric noise. The test accuracy results are on CIFAR-10 and CIFAR-100 with different levels of synthetic symmetric label noise ranging from 20% to 90%. For each method, the best test accuracy across all epochs ("Best") and the averaged test accuracy over the last 10 epochs ("Last") are included. As shown in row 700, DivideMix outperforms various state-of-the-art methods by a large margin across all noise ratios. The improvement is substantial (over 10% in accuracy) for the more challenging CIFAR-100 dataset with high noise ratios.

Figure 8:
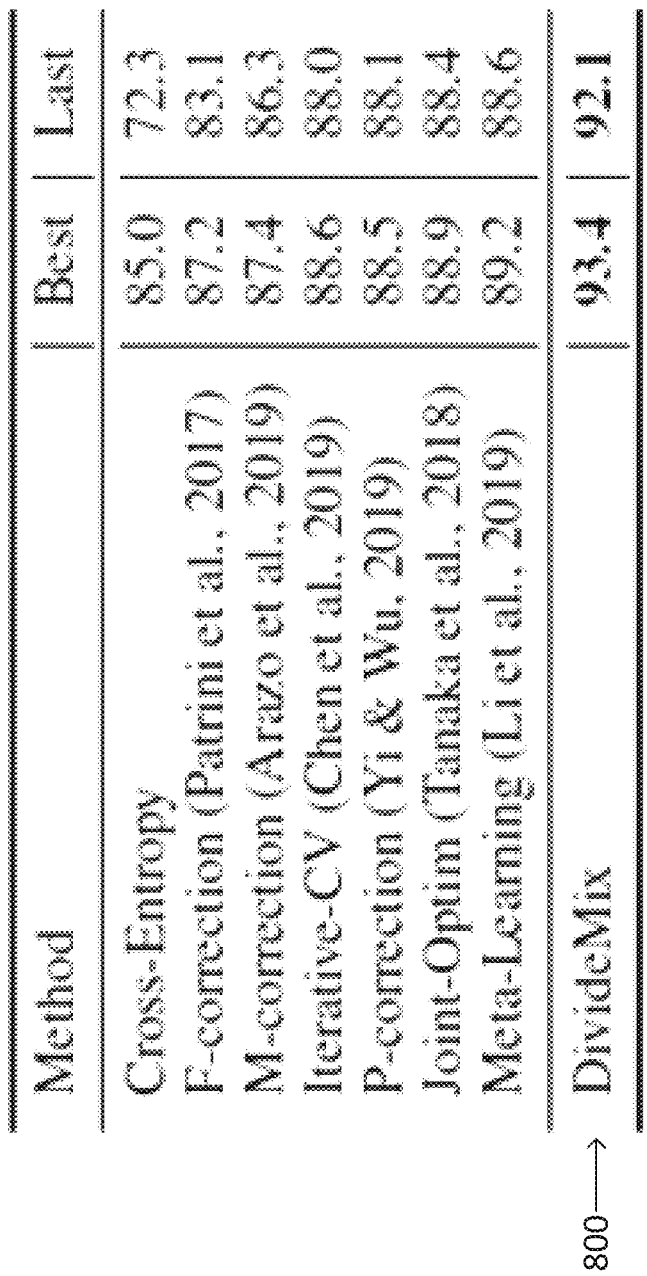
FIG. 8 illustrates comparison of DividMix training with other training methods on a training dataset with synthetic asymmetric label noise according to some embodiments.

Referring to FIG. 8, illustrated therein is the comparison of DivideMix with state-of-the-art methods in test accuracy (%) on CIFAR-10 with 40% synthetic asymmetric noise. As shown in row 800, the DivideMix outperforms various state-of-the-art methods on both the best test accuracy across all epochs ("Best") and the averaged test accuracy over the last 10 epochs ("Last").

Referring to FIGS. 9 and 10, illustrated therein are the comparison of DivideMix with state-of-the-art methods in test accuracy (%) on training datasets Clothing1M, WebVision, and ILSVRC12 with real-world noisy labels. As shown in rows 900 and 1000, DivideMix consistently outperforms various state-of-the-art methods for all three training datasets. For WebVision, DivideMix achieves more than 12% improvement in top-1 accuracy.

Referring FIG. 11, comparison of various configurations for DivideMix is illustrated. Row 1102 is a DivideMix embodiment where the result is the average of predictions from both first and second networks. Row 1104 is a DivideMix embodiment where only prediction from a single network (e.g., first network with parameters $\theta^{(1)}$ is used. The decrease in accuracy from row 1102 to row 1104 indicates that the ensemble of two diverged networks consistently yields better generalization performance than using only one of them.

Row 1106 is a DivideMix embodiment without co-training (e.g., without co-division). At row 1106, a single network is trained using self-divide (i.e. divide the training data based on that single network's own loss). The performance of row 1106 decreases compared to row 1102.

Row 1108 is a DivideMix embodiment without label co-refinement. Row 1110 is a DivideMix embodiment without input augmentation. Row 1112 is an embodiment that combines self-divide with a mix-match process without label co-refinement and co-guessing. The performance of each of rows 1108, 1110, and 1112 decreases compared to row 1102.

Referring to FIG. 12, comparison of DividMix training with more training methods on various training datasets is illustrated. As shown in row 1200, DivideMix outperforms the other methods over both datasets CIFAR-10 and CIFAR-100.

Referring to FIG. 13, various configurations of hyperparameters, specifically, various configurations of the unsupervised loss weight $\lambda$ are illustrated. As shown in FIG. 13, unsupervised loss weight $\lambda$ is configured to have a greater value as the noise ratio increases, because higher noise ratio requires stronger regularization from unlabeled samples (e.g., generated from the noisy samples). Furthermore, more challenging dataset (e.g., CIFAR-100) requires strong regularization from unlabeled samples, thereby requiring greater unsupervised loss weight $\lambda$.

Figure 14:
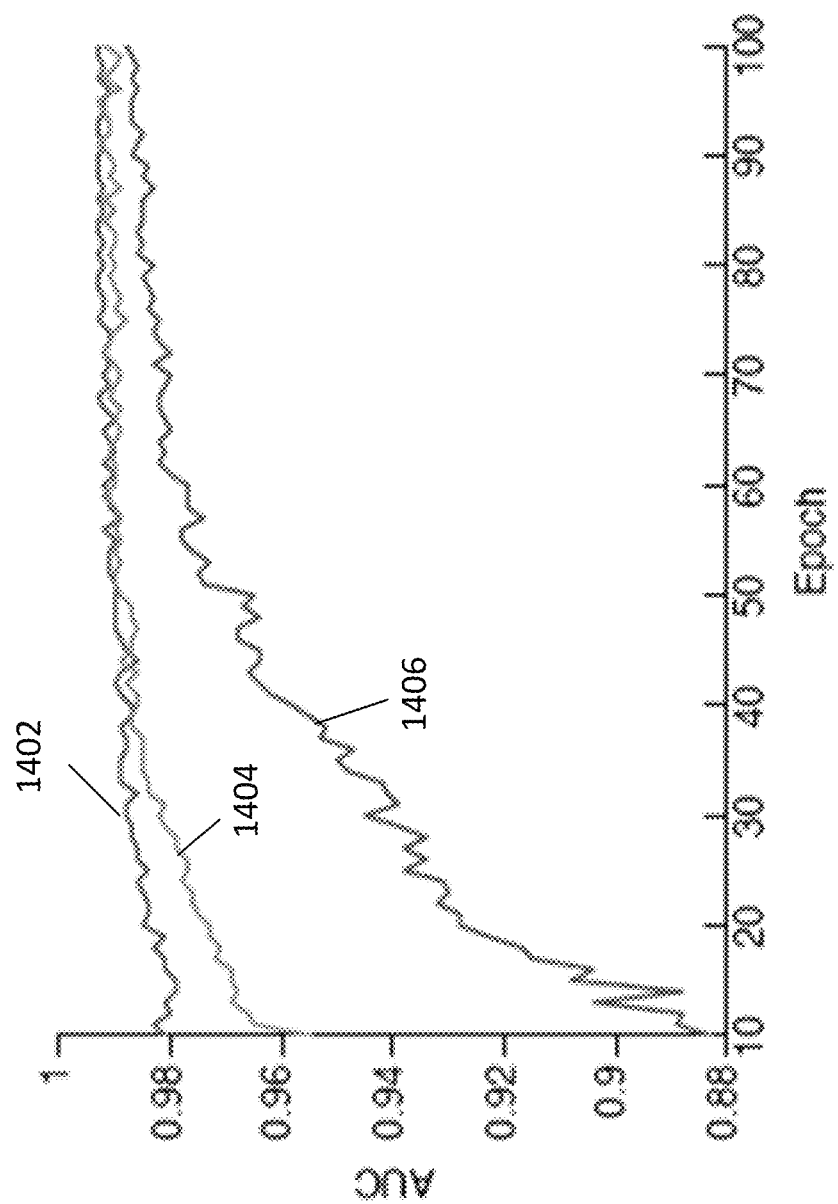
FIG. 14 illustrates area under a curve (AUC) for clean/noisy classification for a training dataset with various levels of synthetic symmetric noise according to some embodiments.

Referring to FIG. 14, AUC curves illustrate that the dataset division in DivideMix helps to eliminate label noise. AUC curves 1402, 1404, and 1406 illustrate clean/noisy classification on CIFAR-10 training samples with 20% label noise, 50% label noise, and 80% label noise respectively.

Figure 15:
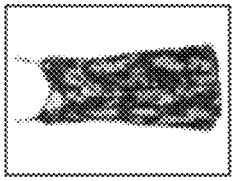
FIG. 15 illustrates using DividMix to identify noisy labels and generate guessed labels for the corresponding noisy samples according to some embodiments.

Referring to FIG. 15, illustrated therein is using DividMix to identify noisy labels and generate guessed labels for the corresponding noisy samples according to some embodiments. In the example of FIG. 15, DivideMix identifies original noisy labels 1500 for various noisy samples. An unlabeled dataset is generated including those noisy samples, and co-guessing process is performed to generate guessed labels 1502. As shown in FIG. 15, the guessed labels 1502 are less noisy (e.g., with higher clean probabilities) than the original noisy labels 1500.

Some examples of computing devices, such as computing device 100 may include non-transitory, tangible, machine readable media that include executable code that when run by one or more processors (e.g., processor 110) may cause the one or more processors to perform the processes of methods 200, 300, 400, and 500. Some common forms of machine readable media that may include the processes of methods 200, 300, 400, and 500 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method for learning with noisy labels, comprising:
generating a first network of a machine learning model with a first set of parameter initial values;
generating a second network of the machine learning model with a second set of parameter initial values;
generating first clean probabilities for a first plurality of samples in a training dataset using the second network;
generating a first labeled dataset including a second plurality of clean samples from the training dataset, wherein the second plurality of clean samples are determined based on the corresponding first clean probabilities;
generating a first unlabeled dataset including a third plurality of noisy samples from the training dataset, wherein the third plurality of noisy samples are determined based on the corresponding first clean probabilities; and
training the first network based on the first labeled dataset and the first unlabeled dataset to update parameters of the first network.

2. The method of claim 1, further comprising:
generating second clean probabilities for the first plurality of samples in the training dataset using the first network;
generating a second labeled dataset and a second unlabeled dataset from the training dataset based on the second clean probabilities; and
training the second network based on the second labeled dataset and the second unlabeled dataset to update parameters of the second network.

3. The method of claim 1, wherein the generating the first clean probabilities includes:
modeling a per-sample loss distribution of the second network using a mixture model.

4. The method of claim 3, wherein the mixture model includes a Gaussian Mixture Model (GMM).

5. The method of claim 1, wherein the second plurality of clean samples are generated based on a comparison of the first clean probabilities and a clean probability threshold.

6. The method of claim 1, wherein the training the first network based on the first labeled dataset and the first unlabeled dataset includes:
performing a mix-match process to generate a first mixed labeled dataset and a first mixed unlabeled dataset based on the first labeled dataset and first unfabled dataset;
generating a first total loss including a first loss on the first mixed labeled dataset and a second loss on the first mixed unlabeled dataset; and
updating the parameters of the first network based on the first total loss.

7. The method of claim 6, wherein the training the first network based on the first labeled dataset and first unlabeled dataset includes:
performing label co-refinement to labels in the first labeled dataset using the first clean probabilities; and
performing label co-guessing to generate guessed labels for the third plurality of noisy samples in the first unlabeled dataset based on predictions from the first network and the second network.

8. A non-transitory machine-readable medium comprising a plurality of machine-readable instructions which, when executed by one or more processors, are adapted to cause the one or more processors to perform a method comprising:
generating a first network of a machine learning model with a first set of parameter initial values;
generating a second network of the machine learning model with a second set of parameter initial values;
generating first clean probabilities for a first plurality of samples in a training dataset using the second network;
generating a first labeled dataset including a second plurality of clean samples from the training dataset, wherein the second plurality of clean samples are determined based on the corresponding first clean probabilities;
generating a first unlabeled dataset including a third plurality of noisy samples from the training dataset, wherein the third plurality of noisy samples are determined based on the corresponding first clean probabilities; and
training the first network based on the first labeled dataset and first unlabeled dataset to update parameters of the first network.

9. The non-transitory machine-readable medium of claim 8, the method further comprising:
generating second clean probabilities for the first plurality of samples in the training dataset using the first network;
generating a second labeled dataset and a second unlabeled dataset from the training dataset based on the second clean probabilities; and
training the second network based on the second labeled dataset and second unlabeled dataset to update parameters of the second network.

10. The non-transitory machine-readable medium of claim 8, wherein the generating the first clean probabilities includes:
modeling a per-sample loss distribution of the second network using a mixture model.

11. The non-transitory machine-readable medium of claim 10, wherein the mixture model includes a Gaussian Mixture Model (GMM).

12. The non-transitory machine-readable medium of claim 8, wherein the first labeled dataset is generated based on a comparison of the first clean probabilities and a clean probability threshold.

13. The non-transitory machine-readable medium of claim 8, wherein the training the first network based on the first labeled dataset and the first unlabeled dataset includes:
performing a mix-match process to generate a first mixed labeled dataset and a first mixed unlabeled dataset based on the first labeled dataset and first unfabled dataset;
generating a first total loss including a first loss on the first mixed labeled dataset and a second loss on the first mixed unlabeled dataset; and
updating the parameters of the first network based on the first total loss.

14. The non-transitory machine-readable medium of claim 13, wherein the training the first network based on the first labeled dataset and first unlabeled dataset includes:
performing label co-refinement to labels in the first labeled dataset using the first clean probabilities; and
performing label co-guessing to generate guessed labels for the third plurality of noisy samples in the first unlabeled dataset based on predictions from the first network and the second network.

15. A system, comprising:
a non-transitory memory; and one or more hardware processors coupled to the non-transitory memory and configured to read instructions from the non-transitory memory to cause the system to perform a method comprising:

generating a first network of a machine learning model with a first set of parameter initial values;

generating a second network of the machine learning model with a second set of parameter initial values;

generating first clean probabilities for a first plurality of samples in a training dataset using the second network;

generating a first labeled dataset including a second plurality of clean samples from the training dataset, wherein the second plurality of clean samples are determined based on the corresponding first clean probabilities;

generating a first unlabeled dataset including a third plurality of noisy samples from the training dataset, wherein the third plurality of noisy samples are determined based on the corresponding first clean probabilities; and training the first network based on the first labeled dataset and the first unlabeled dataset to update parameters of the first network.

16. The system of claim 15, the method further comprising:

generating second clean probabilities for the first plurality of samples in the training dataset using the first network;

generating a second labeled dataset and a second unlabeled training dataset from the training dataset based on the second clean probabilities; and training the second network based on the second labeled dataset and second unlabeled training dataset to update parameters of the second network.

17. The system of claim 15, wherein the generating first clean probabilities includes:

modeling a per-sample loss distribution of the second network using a mixture model.

18. The system of claim 15, wherein the first labeled dataset is generated based on a clean probability threshold.

19. The system of claim 15, wherein the training the first network based on the first labeled dataset and the first unlabeled dataset includes:

performing a mix-match process to generate a first mixed labeled dataset and a first mixed unlabeled dataset based on the first labeled dataset and first unfabled dataset;

generating a first total loss including a first loss on the first mixed labeled dataset and a second loss on the first mixed unlabeled dataset; and updating the parameters of the first network based on the first total loss.

20. The system of claim 19, wherein the training the first network based on the first labeled dataset and first unlabeled dataset includes:

performing label co-refinement to labels in the first labeled dataset using the first clean probabilities; and performing label co-guessing to generate guessed labels for the third plurality of noisy samples in the first unlabeled dataset based on predictions from the first network and the second network.

* * * * *